Patented Sept. 18, 1945

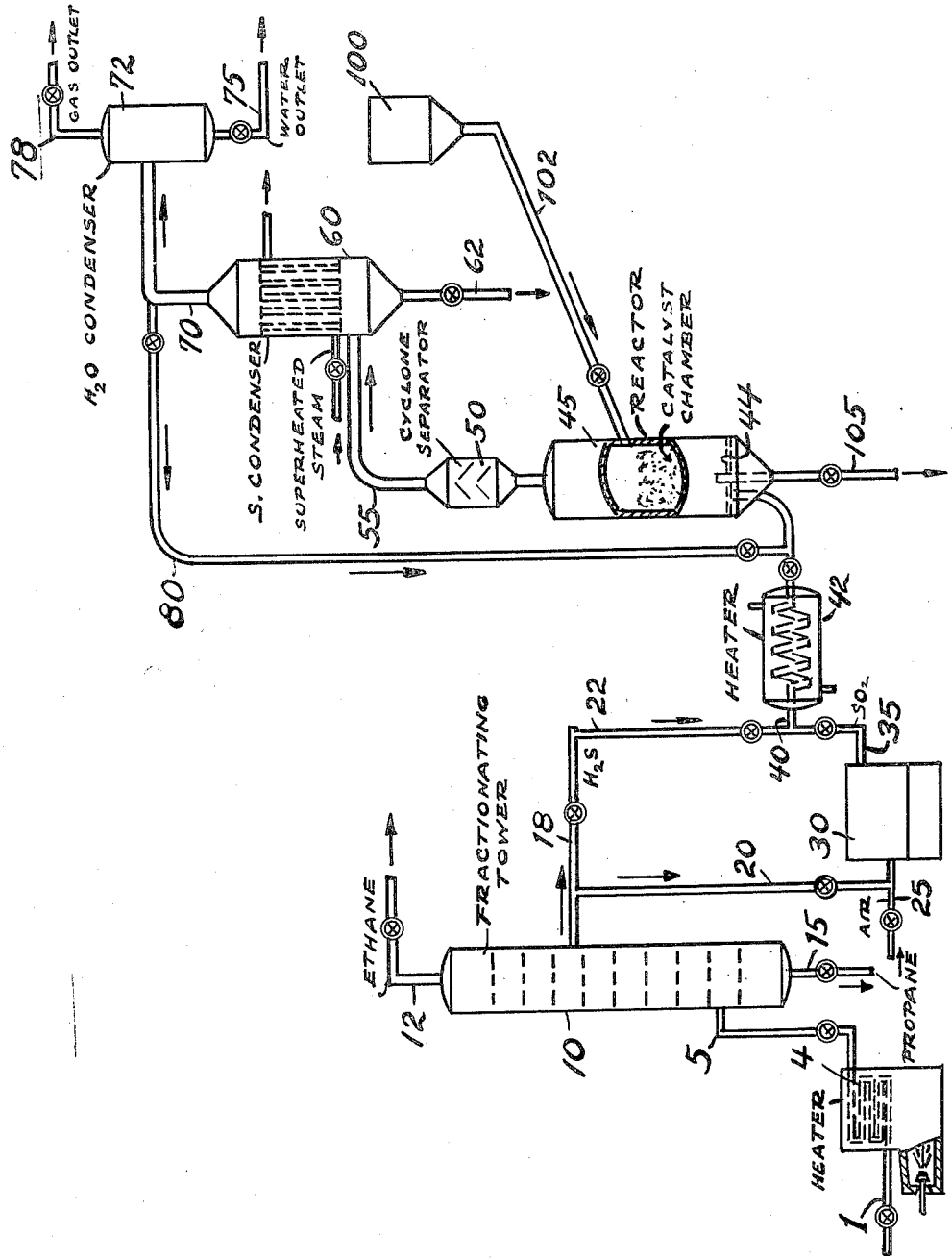

2,384,926

UNITED STATES PATENT OFFICE 2,384,926

PROCESS FOR PRODUCING SULPHUR

Minor C. K. Jones, Mountainside, N. J., assignor to Standard Oil Development Company, a corporation of Delaware Application December 17, 1942, Serial No. 469,280

10 Claims. (Cl. 23—225)

The present invention relates to the utilization and disposal of high hydrogen sulphide content gases to produce elemental sulphur by reaction with $SO_2$ in the presence of a silica gel activated with oxides of boron, sodium and potassium, at atmospheric or superatmospheric pressure and at elevated temperatures.

In many industrial processes waste gases containing hydrogen sulphide are produced in the plant operation. For example, in the manufacture of illuminating and fuel gas by the destructive distillation of coal, hydrogen sulphide is present in the raw gas and generally the gases are treated to remove the hydrogen sulphide. Hydrogen sulphide is also a constituent in natural gas and is produced also in petroleum refineries when operating on sour crudes such as those produced in the West Texas field. There are, of course, many other sources of hydrogen sulphide which must be disposed of in connection with various manufacturing operations.

As is well known, hydrogen sulphide is a toxic, malodorous gas and may become a health hazard if allowed to escape into the atmosphere in quantities. In the vicinity of gas wells which are producing sour gas, extreme precautions must therefore be taken to prevent the escape of this gas into the atmosphere. Now, of course, from the standpoint of conservation, large quantities of hydrogen sulphide are available, containing potentially an enormous amount of sulphur. It has been reported that in the McKamie field in Arkansas, hydrogen sulphide equivalent to 96 tons of sulphur per day are produced. In a large oil refinery operating on sour crudes, the quantity may be of the order of 35 to 40 tons of sulphur per day. The usual method of disposing of this gas is to burn it under boilers, stills, and the like, thus converting the hydrogen sulphide to $SO_2$ and water, which $SO_2$ is less objectionable in the atmosphere than the hydrogen sulphide. The release of large quantities of $SO_2$ into the atmosphere is wasteful of the contained sulphur and, at the same time, its presence is detrimental to vegetation and causes other damage in the vicinity.

Methods of hydrogen sulphide disposal and sulphur recovery have been proposed, such as the reaction of $H_2S$ and $SO_2$ to form free sulphur, but this reaction in general is carried out in an aqueous medium, thus involving the handling of disproportionate quantities of liquids and the separation of the sulphur from large quantities of water. The expense involved in such operations is very large and not justified by the price of the sulphur. Consequently, for the objections noted, this particular process has not been generally adopted by those industries facing the problem of hydrogen sulphide disposal. Efforts have been made in the past to carry out the reaction between $H_2S$ and $SO_2$ in an anhydrous state, but these attempts have not evolved a practical process.

I have now found a practical method whereby the reaction between $H_2S$ and $SO_2$ to form elemental sulphur and water can be carried out. In general, this method involves passing a mixture of hydrogen sulphide and sulphur dioxide, preferably in approximately molecular proportions, over a suitable catalyst under such temperature conditions as to give a practical rate of reaction, and fractionally condensing the reaction products so that sulphur is removed in the molten state. While pressures above atmospheric are not essential in my process, the size of the equipment can be reduced by employing pressures up to several hundred pounds per square inch gauge may be used. A suitable catalyst for this purpose comprises a major proportion of silica, such as silica gel or other form of finely divided silica, to which is added a minor proportion of certain activators. The oxides of boron, sodium, and potassium are particularly effective, although other alkali and alkali earth oxides may be used. In certain instances it is also desirable to have present a certain percentage of aluminum oxide. Furthermore, the catalyst may be prepared by activating the surface of finely divided silica, such as silica gel, with activating agents. In other cases, it is desirable actually to melt the components together to form a glass-like material which is then cooled and powdered to the desired degree.

One object of my present invention therefore is to provide an efficient, economical and satisfactory method for disposing of $H_2S$.

A more specific object of my invention is to provide a continuous process where large quantities of gases containing $H_2S$ may be treated catalytically to convert them to gases or vapors which may be safely discharged into the atmosphere or further processed or utilized, and, at the same time, to recover from the process elemental sulphur.

Other objects of my invention will appear from the following more detailed description and claims.

In order to afford a better understanding of my invention I have shown in the accompanying drawing diagrammatically, a flow plan which illustrates a preferred modification of my invention.

I shall now set forth a specific example illustrating my invention and for clarity of exposition, I shall refer to the accompanying drawing.

We will assume that a refinery processing a sour crude has a large volume of normally gaseous constituents containing substantial quantities of H₂S and that it is necessary for purposes of public health, etc., to convert the hydrogen sulphide into a non-toxic gas or other material which may be discharged into the atmosphere or into streams and, at the same time, to recover sulphur as a by-product. Ordinarily, the H₂S would be associated with the ethane, propane, or other C₂ and C₃ hydrocarbons.

Referring in detail to the drawing, the cut or fraction in question is introduced into the present system from some refinery source through line 1, thence heated in a heater 4, and thence conducted via line 5 into fractionating column 10. In fractionating column 10 the C₂ hydrocarbons are taken off overhead through line 12, while the propane is taken off as bottoms through line 15. The H₂S fraction, on the other hand, is recovered through line 18 and then specially processed in the manner which will be presently described. Speaking generally at first, it is pointed out that the H₂S will eventually be treated with a fluidized catalyst in a reaction chamber wherein it will be converted to water vapor or steam and sulphur in the presence of an oxidizing gas, such as ordinary air. To this end, therefore, the H₂S in line 18 is split between two streams 20 and 22 in the ratio of about 1 volume of H₂S in line 20 to 2 volumes in line 22. The H₂S in line 20 is discharged into air inlet stream 25 where it is mixed with sufficient air to burn the H₂S and then the mixture is burned in furnace 30, the SO₂ together, of course, with water vapor, steam and nitrogen being withdrawn through line 35 and mixed with the balance of the original H₂S in line 40, whereupon it is discharged into a heater 42 and thence discharged into the bottom of reaction chamber 45 containing a powdered catalyst material adapted to accelerate or advance the reaction between H₂S and SO₂. The catalyst preferably contains silica activated with a small amount of boron oxide.

With respect to the catalyst, I have found that good results are obtained by using the following composition:

| | Per cent by weight |
|---|---|
| SiO (sand) | 80 |
| B₂O₃ | 12 |
| Na₂O | 4 |
| Al₂O₃ | 4 |

These proportions may be varied considerably with respect to the B₂O₃ down to 1%, and with respect to the Na₂O also, which may vary from 1 to 6% or so. Instead of using Na₂O, I may use K₂O. As previously indicated, other acid radicals may be employed instead of B₂O₃. The Al₂O₃ may be omitted from the composition but its presence is beneficial. I consider the SiO₂ and the acidic anhydride to comprise the important components in my catalyst.

The catalyst is ground to a particle size of from 20-400 mesh, preferably somewhere in the range of from 100-200 mesh, and the entering reactants pass upwardly into the reactor 45 through the foraminous member 44 which may be an ordinary screen or grid plate positioned, as shown, at near the bottom of the reactor. The superficial velocity of the gases and/or vapors in reactor 45 is controlled somewhere within the limits of from 2 to 3 to 20 feet per second, preferably from 5 to 10 feet per second. The rate of flow of vapors with the catalyst suspended is such, within the reactor 45, that the catalyst is maintained in the form of a "fluidized," turbulent, highly agitated mass resembling a boiling liquid. This mass of material may have a density of 5-12 lbs. per cubic foot and is characterized by the fact that while the general flow of catalyst is upwardly, there are numerous cross currents and downwardly flowing streams, all of which create a condition of intimate and complete mixing, furthering the condition of substantially uniform temperature conditions throughout the reactor. Ordinarily the reactants remain resident in the reaction zone for a period of from 5 to 15 seconds, more or less, and the suspension then passes into a cyclone separator 50 superposed at the top of the reactor as shown. In the cyclone or other separator 50, the catalyst is separated and gravitates back into the catalyst chamber 45.

In the particular operation in question, the catalyst does not require regeneration, since the operation is such that carbonaceous deposits are not formed on the catalyst. Hence the process may continue without interruption for an extended period of time, in fact, until the catalyst becomes such that it is no longer active, which may be a period of several months.

The vapors are withdrawn overhead from the cyclone separator 50 through line 55 and thence pass into a sulphur condenser 60 where the sulphur is condensed to a liquefied state and withdrawn from the system through line 62. The steam, water vapor and other gas, on the other hand, are withdrawn overhead from condenser 60 through line 70 and thence passed into a water condenser 72 from which the water may be withdrawn through line 75, while the permanent gases may be discharged from the system through line 78. A portion of the gas in line 70 may be recycled through line 80 into the reaction chamber 45.

While I have shown merely one cyclone separator 50 for separating catalyst from the reaction gases and vapors, it is to be understood that I prefer to employ a plurality of these separators supplemented by one or more electrical precipitators, in order to insure complete removal of catalyst from gases.

Another modification of my invention relates to expanding the internal diameter of chamber 45 to form a disengaging chamber having a depth of 11-12 feet wherein the superficial velocity of the gases is reduced to 0.5 to 1 foot per second, whereupon the main bulk of the catalyst, namely, 98-99% or more of the catalyst settles and gravitates out of the gases and returns to the main bulk of the catalyst in the lower portion of the reaction chamber 45. In this modification of my reactor, I of course eliminate a large number of cyclone separators and other gas-solid contact separating devices and therefore effect considerable economy in equipment. Attention is also directed to the fact that I may feed fresh or make-up catalyst to the reactor from hopper 100 through line 102 and, at the same time, withdraw catalyst through valved bottom draw-off pipe 105 extending above the grid plate 44, thus replenishing the catalyst when necessary without interrupting the operation. Since the reaction is exothermic, I prefer to withdraw catalyst from reactor 45 continuously, cool it to say 300° F. to 500° F. and return it via hopper 100 and pipe 102 to the reactor. The reactor 45 is preferably provided with a temperature recording device and the cooled catalyst should be added to prevent undue temperature rises.

I have shown in the drawing, a modification which permits numerous alterations to be made by those skilled in the art without departing from the spirit thereof. Thus the system which I have shown is adapted to be provided with various known expedients for conserving heat by countercurrent heat interchange between fluids and/or solids of different temperatures. These expedients will be readily apparent to engineers and for clarity I have not included all of the possible ramifications of my invention in this present description. I wish to mention that a portion of the recovered sulphur from 62 could be burned and $SO_2$ introduced at line 35 without burning $H_2S$ from the feed gas. Such a modification would permit utilizing the process described on a mixture containing other gases than $H_2S$, which should not be contaminated with nitrogen nor burned.

Further illustrating my invention, particularly with reference to operating conditions, I wish to point out that as to the main reaction taking place, that is $SO_2$ and $H_2S$ to produce sulphur, experiments carried out at 896° F. were made to determine whether any advantage would be gained by using the gases in other than molecular proportions. The following tables show the results of these experiments:

| Per cent $H_2S$ | Per cent $SO_2$ | Per cent of theoretical yield obtained |
|---|---|---|
| 70 | 30 | 17.7 |
| 50 | 50 | 21.5 |
| 25 | 75 | 13.3 |

In this case the conditions were set so as to give only partial theoretical yield. The tests showed that best results were attained by equal molecular proportions.

While the reaction takes place slowly at lower temperatures, experimental results show that increasing the temperature hastens the speed of reaction. For instance, when a mixture of hydrogen sulphide and sulphur dioxide in approximately molecular proportions was passed over an activated silica catalyst with a very short time of contact, say 2–3 seconds, in order that only partial conversion would be attained, thereby allowing the effects of temperature to be observed, the following results were obtained:

| Temperature | Per cent theoretical conversion |
|---|---|
| 820° F | 10.8 |
| 1022° F | 30.8 |
| 1150° F | 39.0 |
| 1270° F | 44.8 |
| 1351° F | 49.5 |

In the preferred modification of my invention, I prefer to have the catalyst in such a form that the gases pass upwardly concurrently with the catalyst causing the catalyst to be fluidized and to behave like a boiling liquid. Preferably the superficial velocity of the gas is so regulated as not to carry the catalyst in substantial quantities out of the catalyst chamber but with sufficient velocity to maintain the catalyst in a fluid condition. This gas rate will vary somewhat with the specific gravity of the catalyst involved, but in general the gas velocity will be of the order of 0.5 to 5 feet per second. As to temperature, since experimental results show that the reaction takes place over a wide range, a portion of which is too high to be carried out in conventional equipment, I prefer to operate somewhere in the middle of the range, say from 700° F. to 1150° F., preferably in the range of from 850° F. to 1000° F. Under these latter conditions, usual materials of construction are available and the rate of reaction will be satisfactory and the sulphur produced will be in the form of vapor.

In order to remove the sulphur from the reaction products it is quite essential that the temperature be maintained at such a point that the water vapor present is not condensed to water, and further it is desired that the sulphur be removed in its most fluid form; that is, at the temperature where the more viscous forms of sulphur are not produced. I therefore prefer to maintain the temperature of the sulphur condenser between 250° F. and 300° F. Under these conditions the sulphur is removed as a liquid product which is free flowing, and the water vapors pass out in a somewhat superheated condition.

Obviously, many modifications of my invention will appear to those who are familiar with this art. For instance, instead of dividing the $H_2S$ stream in line 18 into one part discharged into line 20 and two parts by volume into line 22, other proportions may be used, such as equal parts of the $H_2S$ stream into each line.

In the specific example above set forth, I have described the method of recovering sulphur from refinery gases. Obviously the same process could be applied to gases from any source which contained appreciable quantities of $H_2S$, it being preferable of course to separate the $H_2S$ from the other gases by fractional distillation or by some other convenient method, although the present invention could be applied directly to a mixed gas containing $H_2S$ as the means of $H_2S$ removal.

What I claim is:

1. The method of producing sulphur from hydrogen sulphide which comprises maintaining a mass of powdered catalyst in a reaction zone in the form of a dense suspension, continuously forcing into said reaction zone a mixture of about equal molecular proportions of $SO_2$ and $H_2S$ at elevated temperatures, regulating the superficial velocity of the gaseous mixture in said reaction zone to cause the catalyst to be maintained in the form of a turbulent, dense suspension, permitting the reactance to remain in the reaction zone for a period of time sufficient to cause the desired conversion of hydrogen sulphide to sulphur by interaction with $SO_2$, withdrawing the reaction products, cooling to a temperature sufficient to liquefy the sulphur and withdrawing the latter from the system.

2. The method of claim 1, carried out at a temperature of about 896° F.

3. A continuous process for producing sulphur from $H_2S$ which comprises forming a dense suspension of a powdered catalyst consisting of $SiO_2$ and a minor proportion of $B_2O_3$ in a reaction zone by simultaneously discharging said catalyst and gases containing about equal molecular proportions of $H_2S$ and $SO_2$ into said zone, causing the gases to flow upward in said zone at a superficial velocity such that the catalyst due to slippage and delayed settling becomes compacted into a dense yet highly fluid mass resembling a liquid, controlling the temperature in the reaction zone within active reaction temperatures, withdrawing the reaction products from the reaction zone and recovering sulphur therefrom.

4. The method of recovering sulphur from hydrocarbon gases containing hydrogen sulphide which comprises fractionating the gases to separate a hydrogen sulphide fraction, oxidizing a portion of said hydrogen sulphide, combining the sulphur dioxide thus formed with the untreated portion of said hydrogen sulphide in about equal molecular amounts, discharging the mixture into a reaction chamber where it contacts a powdered catalyst material, passing the gas mixture upwardly through the reaction chamber at such a rate of flow as to form a dense turbulent, ebullient suspension of the powdered catalyst resembling a boiling liquid, permitting the mixture of hydrogen sulphide and sulphur dioxide to remain in said suspension for a sufficient period of time to convert the hydrogen sulphide and sulphur dioxide into water and elemental sulphur, removing the reaction products from said suspension and said reaction chamber, cooling the products to cause liquefaction of the sulphur, and recovering the said sulphur.

5. The method set forth in claim 4 wherein the catalyst is silica containing a minor proportion of $B_2O_3$.

6. The method of producing sulphur from hydrogen sulphide which comprises maintaining a mass of powdered catalyst in a reaction zone, continuously forcing into said reaction zone a mixture of sulphur dioxide and hydrogen sulphide in about equal molecular proportions at elevated temperatures, regulating the velocity of the gas mixture in said reaction zone to cause the catalyst to be maintained in the form of a turbulent dense suspension resembling a boiling liquid, permitting the reactants to remain in the reaction zone for a period of time sufficient to cause the desired conversion of hydrogen sulphide to sulphur by interaction with sulphur dioxide withdrawing the reaction products from said suspension and reaction zone, cooling to a temperature sufficient to liquefy the sulphur and withdrawing the latter from the system.

7. The method set forth in claim 6 wherein the catalyst is silica containing a minor proportion of $B_2O_3$.

8. The method of producing sulphur from hydrogen sulphide which comprises maintaining a catalyst mass of powdered silica containing a minor proportion of $B_2O_3$ in a reaction zone in the form of a dense suspension, continuously forcing into said reaction zone a mixture of $SO_2$ and $H_2S$ at elevated temperatures, regulating the superficial velocity of the gaseous mixture in said reaction zone to cause the catalyst to be maintained in the form of a turbulent, dense suspension, permitting the reactants to remain in the reaction zone for a period of time sufficient to cause the desired conversion of hydrogen sulphide to sulphur by interaction with $SO_2$, withdrawing the reaction products, cooling to a temperature sufficient to liquefy the sulphur and withdrawing the latter from the system.

9. The method of recovering sulphur from hydrocarbon gases containing hydrogen sulphide which comprises fractionating the gases to separate a hydrogen sulphide fraction, oxidizing a portion of said hydrogen sulphide, combining the sulphur dioxide thus formed with the untreated portion of said hydrogen sulphide in about equal molecular amounts, discharging the mixture into a reaction chamber where it contacts a powdered silica catalyst containing a minor proportion of $B_2O_3$, passing the gas mixture upwardly through the reaction chamber at such a rate of flow as to form a dense turbulent, ebullient suspension of the powdered catalyst resembling a boiling liquid, permitting the mixture of hydrogen sulphide and sulphur dioxide to remain in said suspension for a sufficient period of time to convert the hydrogen sulphide and sulphur dioxide into water and elemental sulphur, removing the reaction products from said suspension and said reaction chamber, cooling the products to cause liquefaction of the sulphur, and recovering the said sulphur.

10. The method of producing sulphur from hydrogen sulphide which comprises maintaining a catalyst mass of powdered silica containing a minor proportion of $B_2O_3$ in a reaction zone, continuously forcing into said reaction zone a mixture of sulphur dioxide and hydrogen sulphide in about equal molecular proportions at elevated temperatures, regulating the velocity of the gas mixture in said reaction zone to cause the catalyst to be maintained in the form of a turbulent dense suspension resembling a boiling liquid, permitting the reactants to remain in the reaction zone for a period of time sufficient to cause the desired conversion of hydrogen sulphide to sulphur by interaction with sulphur dioxide, withdrawing the reaction products from said suspension and reaction zone, cooling to a temperature sufficient to liquefy the sulphur and withdrawing the latter from the system.

MINOR C. K. JONES.